United States Patent
Moon et al.

(10) Patent No.: US 9,306,216 B2
(45) Date of Patent: Apr. 5, 2016

(54) NEGATIVE ACTIVE MATERIAL, METHOD OF PREPARING THE SAME, NEGATIVE ELECTRODE FOR LITHIUM SECONDARY BATTERY INCLUDING NEGATIVE ACTIVE MATERIAL, AND LITHIUM SECONDARY BATTERY INCLUDING NEGATIVE ELECTRODE

(71) Applicant: SAMSUNG SDI CO., LTD., Yongin-si, Gyeonggi-do (KR)

(72) Inventors: Sung-Hwan Moon, Yongin-si (KR); Jae-Hyuk Kim, Yongin-si (KR); Seung-Uk Kwon, Yongin-si (KR); Chang-Ui Jeong, Yongin-si (KR); Yo-Han Park, Yongin-si (KR); Soon-Sung Suh, Yongin-si (KR); Chun-Gyoo Lee, Yongin-si (KR); Jong-Seo Choi, Yongin-si (KR); Yury Matulevich, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 347 days.

(21) Appl. No.: 13/670,417

(22) Filed: Nov. 6, 2012

(65) Prior Publication Data

US 2013/0196233 A1  Aug. 1, 2013

Related U.S. Application Data

(60) Provisional application No. 61/593,769, filed on Feb. 1, 2012.

(51) Int. Cl.
*H01M 4/1395*   (2010.01)
*H01M 4/134*    (2010.01)
(Continued)

(52) U.S. Cl.
CPC ............... *H01M 4/386* (2013.01); *C22C 28/00* (2013.01); *H01B 1/023* (2013.01); *H01M 4/04* (2013.01); *H01M 4/134* (2013.01); *H01M 4/1395* (2013.01); *H01M 10/0525* (2013.01); *B82Y 30/00* (2013.01); *Y02E 60/122* (2013.01); *Y02T 10/7011* (2013.01)

(58) Field of Classification Search
None
See application file for complete search history.

(56) References Cited

U.S. PATENT DOCUMENTS 6,627,350 B2   9/2003   Hashimoto et al.
6,730,434 B1   5/2004   Kawakami et al.
(Continued)

FOREIGN PATENT DOCUMENTS

JP   6-325764 A     11/1994
JP   2001-338646 A  12/2001
(Continued)

OTHER PUBLICATIONS

Machine translation of KR 1020050090220, retrieved from <http://kposd.kipo.go.kr:8088/up/kpion/> on Apr. 6, 2015.*
(Continued)

*Primary Examiner* — Cynthia K Walls
(74) *Attorney, Agent, or Firm* — Lewis Roca Rothgerber Christie LLP

(57) ABSTRACT

A negative active material for a rechargeable lithium battery includes a Si—Al—Fe alloy represented by Formula 1. The Si—Al—Fe alloy includes a Si phase and an alloy phase, and the alloy phase includes Si, Al, and Fe in a ratio of atomic percentages of about 3:3:2:

$x\text{Si-}y\text{Al-}z\text{Fe}$   Formula 1 wherein 50 at %$\leq x \leq$90 at %, 5 at %$\leq y \leq$30 at %, 5 at %$\leq z \leq$30 at %, and $x+y+z=100$ at %.

20 Claims, 5 Drawing Sheets

(51) Int. Cl.
  *H01M 4/13* (2010.01)
  *H01M 4/38* (2006.01)
  *H01B 1/02* (2006.01)
  *H01M 4/04* (2006.01)
  *H01M 10/0525* (2010.01)
  *C22C 28/00* (2006.01)
  *B82Y 30/00* (2011.01)

(56) References Cited

U.S. PATENT DOCUMENTS

2003/0134198 A1 7/2003 Sawa et al.
2005/0031957 A1 2/2005 Christensen et al.
2007/0128517 A1 6/2007 Christensen et al.

FOREIGN PATENT DOCUMENTS

JP         3733292 B2   1/2006
KR   10-2005-0090220 A   9/2005

OTHER PUBLICATIONS

English Machine Translation of Japanese Publication No. JP 1994-325764 A listed above, 11 pages.

European Search Report dated Apr. 19, 2013 issued in European Patent Application No. 12194299.9, 6 pages.

\* cited by examiner

NEGATIVE ACTIVE MATERIAL, METHOD OF PREPARING THE SAME, NEGATIVE ELECTRODE FOR LITHIUM SECONDARY BATTERY INCLUDING NEGATIVE ACTIVE MATERIAL, AND LITHIUM SECONDARY BATTERY INCLUDING NEGATIVE ELECTRODE

CROSS-REFERENCE TO RELATED APPLICATION

This application claims priority to and the benefit of U.S. Provisional Application No. 61/593,769, filed in the United States Patent and Trademark Office on Feb. 1, 2012, the entire contents of which are incorporated herein by reference.

BACKGROUND

1. Field

The disclosure relates to negative active materials, methods of preparing the same, negative electrodes for lithium secondary batteries that include the negative active materials, and lithium secondary batteries including the negative electrode.

2. Description of the Related Art

Lithium secondary batteries used in portable electronic devices, such as personal digital assistances (PDAs), mobile phones, notebook computers; electric bicycles; electronic vehicles, etc. have discharge voltages that are at least two times greater than that of conventional batteries. Accordingly, lithium secondary batteries exhibit high energy densities.

A typical lithium secondary battery includes an electrode assembly including a positive electrode, a negative electrode, and either an organic electrolytic solution or a polymer electrolyte filling the space between the positive and negative electrodes. The positive and negative electrodes each include an active material that allows lithium ions to be intercalated and deintercalated. In this structure, when lithium ions are intercalated and deintercalated between the positive and negative electrodes, oxidation and reduction reactions occur, and thus, electrical energy is generated.

The positive active materials of lithium secondary batteries may be oxides of lithium and a transition metal that allow intercalation of lithium ions, such as a lithium cobalt oxide (LiCoO$_2$), a lithium nickel oxide (LiNiO$_2$), or a lithium nickel cobalt manganese oxide (e.g., Li[NiCoMn]O$_2$ or Li[Ni$_{1-x-y}$Co$_x$M$_y$]O$_2$).

Research into negative active materials that allow intercalation and deintercalation of lithium ions, such as various types of carbonaceous materials including artificial and natural graphite and hard carbon, and non-carbonaceous materials such as Si, has been conducted. However, non-carbonaceous materials such as Si repeatedly undergo volumetric expansion and contraction during intercalation and deintercalation of lithium ions, and thus, a negative electrode including such a non-carbonaceous material has an unstable structure and decreased cycle-life. To address problems with carbonaceous and non-carbonaceous active materials, research into Si-based alloys has been conducted.

Si-based alloys may be, for example, Si—Ti—Ni alloys. A Si—Ti—Ni alloy comprises a matrix phase of Si$_7$Ti$_4$Ni$_4$ in the alloy where an atom percent (at %) ratio of Si to Ti to Ni is 7:4:4. However, this matrix phase contains a relatively large amount of Si, and thus a large amount of Si in the alloy is consumed in an inactive phase that does not react with lithium. In addition, raw material costs for Si—Ti—Ni alloys are high.

SUMMARY

Aspects of embodiments of the present invention are directed toward a negative active material having improved initial discharge capacity and cycle characteristics.

One or more embodiments of the present invention include methods of preparing the negative active materials.

One or more embodiments of the present invention include negative electrodes for lithium secondary batteries that include the negative active materials.

One or more embodiments of the present invention include lithium secondary batteries including the negative electrodes.

In one embodiment of the present invention, a negative active material for a rechargeable lithium battery includes a Si—Al—Fe alloy represented by Formula 1, in which the Si—Al—Fe alloy includes a Si phase and an alloy phase, and the alloy phase includes Si, Al, and Fe in a ratio of atomic percentages of about 3:3:2:

$x$Si-$y$Al-$z$Fe        Formula 1 wherein 50 at %≤x≤90 at %, 5 at %≤y≤30 at %, 5 at %≤z≤30 at %, and x+y+z=100 at %.

The alloy phase may register an X-ray diffraction peak at a Bragg angle 2θ of about 20° to about 60° when measured using a CuK-α X-ray wavelength of 1.541 Å.

The alloy phase may register a primary X-ray diffraction peak at a Bragg angle 2θ of about 44.7±1.0° when measured using a CuK-α X-ray wavelength of 1.541 Å. The alloy phase may register a first secondary X-ray diffraction peak at a Bragg angle 2θ of about 24.6±1.0° when measured using a CuK-α X-ray wavelength of 1.541 Å or a second secondary X-ray diffraction peak at a Bragg angle 2θ of about 47.0±1.0° when measured using a CuK-α X-ray wavelength of 1.541 Å.

In Formula 1, y may be greater than z.

The Si—Al—Fe alloy may further include a second alloy phase, and the second alloy phase may include Al and Fe in a ratio of atomic percentages of about 1 or greater.

At least a portion of the Si—Al—Fe alloy may include a uniform dispersion of the Si phase and the alloy phase.

A ratio of Si at % of the Si phase to Si at % of the alloy phase in the Si—Al—Fe alloy in the Si—Al—Fe alloy may be about 1:0.5 to about 1:12.

The alloy phase may be a matrix phase. The Si phase may include Si active metal particles.

The Si active metal particles may have an average particle size of about 10 nm to about 200 nm.

The Si—Al—Fe alloy may include a quenched alloy quenched at a rate of about 10$^3$ K/sec to about 10$^7$ K/sec.

The Si—Al—Fe alloy may include Si, Al, and Fe, and at least one of the Si, Al, or Fe may be doped with a transition metal selected from Ni, Co, Cu, Cr, Zr, Ti, Mn, V, Zn, and combinations thereof. The Si, Al, or Fe may be doped with an amount of the transition metal of about 0.1 at % to about 5 at %.

A method of manufacturing a negative active material for a rechargeable lithium battery includes preparing a parent alloy including a Si—Al—Fe alloy represented by Formula 1:

$x$Si-$y$Al-$z$Fe        Formula 1 wherein 50 at %≤x≤90 at %, 5 at %≤y≤30 at %, 5 at %≤z≤30 at %, and x+y+z=100 at %; cooling the parent alloy to prepare an alloy ribbon to form a Si phase and an alloy phase, the alloy phase including Si, Al, and Fe in a ratio of atomic percentages of about 3:3:2; and pulverizing the alloy ribbon to prepare an alloy powder.

The preparing the parent alloy includes vacuum induction melting, arc melting or mechanical alloying.

The cooling the parent alloy includes quenching the parent alloy at a rate of about $10^3$ K/sec to about $10^7$ K/sec.

The quenching includes melt spinning or gas atomization.

The alloy powder has a median particle diameter (D50) of about 0.1 μm to about 10 μm.

A rechargeable lithium battery includes a negative electrode including the negative active material of claim 1; a positive electrode including a positive active material; and an electrolyte.

DETAILED DESCRIPTION

Figure 1:
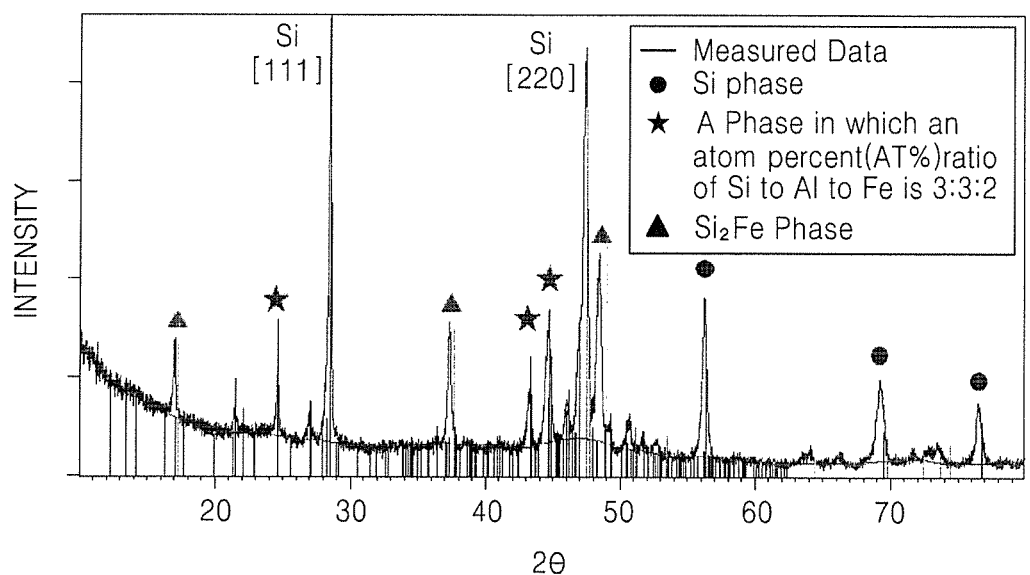
FIG. 1 is a graph of the X-ray diffraction (XRD) analysis results of a negative active material consisting of an alloy of Si, Al, and Fe, prepared according to Example 1.

Hereinafter, one or more embodiments of a negative active material, a method of preparing the same, a negative electrode for a lithium secondary battery that includes the negative active material, and a lithium secondary battery including the negative electrode will be described in detail with reference to the accompanying drawings. However, these embodiments are provided only for illustrative purposes and are not intended to limit the scope of the present invention.

According to an embodiment of the present invention, a negative active material includes a Si—Al—Fe alloy represented by Formula 1 below, wherein the Si—Al—Fe alloy includes a Si phase and an alloy phase including Si, Al, and Fe in a ratio of atomic percentages of 3:3:2.

$x$Si-$y$Al-$z$Fe                                                          Formula 1 where 50 at %≤x≤90 at %, 5 at %≤y≤30 at %, 5 at %≤z≤30 at %, and x+y+z=100 at %.

In the Si—Al—Fe alloy, 50 at %≤x≤90 at %, 5 at %≤y≤30 at %, and 5 at %≤z≤30 at %. In some embodiments, 60 at %≤x≤90 at %, and in other embodiments 65 at %≤x≤90 at %. In some embodiments, 5 at %≤y≤25 at %, and in other embodiments, 5 at %≤y≤20 at %. In some embodiments, 5 at %≤z≤25 at %, and in other embodiments, 5 at %≤z≤20 at %. In some embodiments, y>z.

In the negative active material, the Si—Al—Fe alloy may include an active portion including a Si phase capable of reversibly reacting with lithium ions and an inactive portion that does not react with lithium ions, i.e., an alloy phase in which a ratio of atomic percentages of Si to Al to Fe is 3:3:2.

The negative active material contains 50 to 90 at % Si, and thus a lithium secondary battery with relatively high capacity may be obtained. In addition, the negative active material has an inactive phase that does not react with lithium ions, i.e., an alloy phase in which a ratio of atomic percentages of Si to Al to Fe is 3:3:2. As a result of the inactive phase, destruction of the lithium secondary battery by stress due to the volumetric change of Si during charging and discharging cycles may be prevented or reduced. Accordingly, lithium secondary batteries including the negative active material according to embodiments of the present application may have improved cycle-life characteristics.

The Si—Al—Fe alloy may include a portion in which the Si phase and the alloy phase are uniformly dispersed. When the Si—Al—Fe alloy includes a portion in which the Si phase and the alloy phase are uniformly dispersed, lithium secondary batteries including the negative active material according to embodiments of the present application may have improved charge and discharge characteristics.

The ratio of Si at % of the Si phase to Si at % of the alloy phase (in which the ratio of atomic percentage of Si to Al to Fe is 3:3:2) in the Si—Al—Fe alloy may be about 1:0.5 to about 1:12. In some embodiments, the ratio of Si at % of the Si phase to Si at % of the alloy phase in the Si—Al—Fe alloy may be about 1:0.5 to about 1:10. When the ratio of Si at % of the Si phase to Si at % of the alloy phase in the Si—Al—Fe alloy is within the above described ranges, the active Si phase capable of reversibly reacting with lithium ions, and the inactive alloy phase that does not react with lithium ions are appropriately mixed. Accordingly, lithium secondary batteries including the negative active material according to embodiments of the present invention may have improved capacity and cycle-life characteristics.

The alloy phase (where the ratio of atomic percentages of Si to Al to Fe is 3:3:2) in the alloy may be formed as a matrix phase. The matrix phase does not react with lithium ions and thus acts as a buffer to the volumetric change of Si during charging and discharging cycles, thereby improving the electron conductivity of the Si phase and the cycle-life characteristics of the lithium secondary battery.

Figure 2:
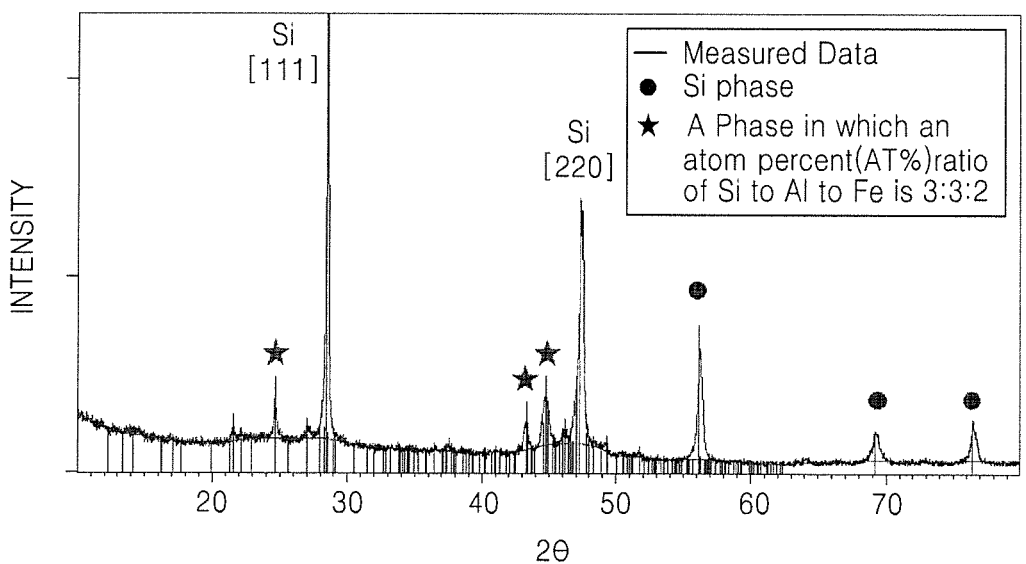
FIG. 2 is a graph of the XRD analysis results of a negative active material consisting of an alloy of Si, Al, and Fe, prepared according to Example 2.
Figure 3:
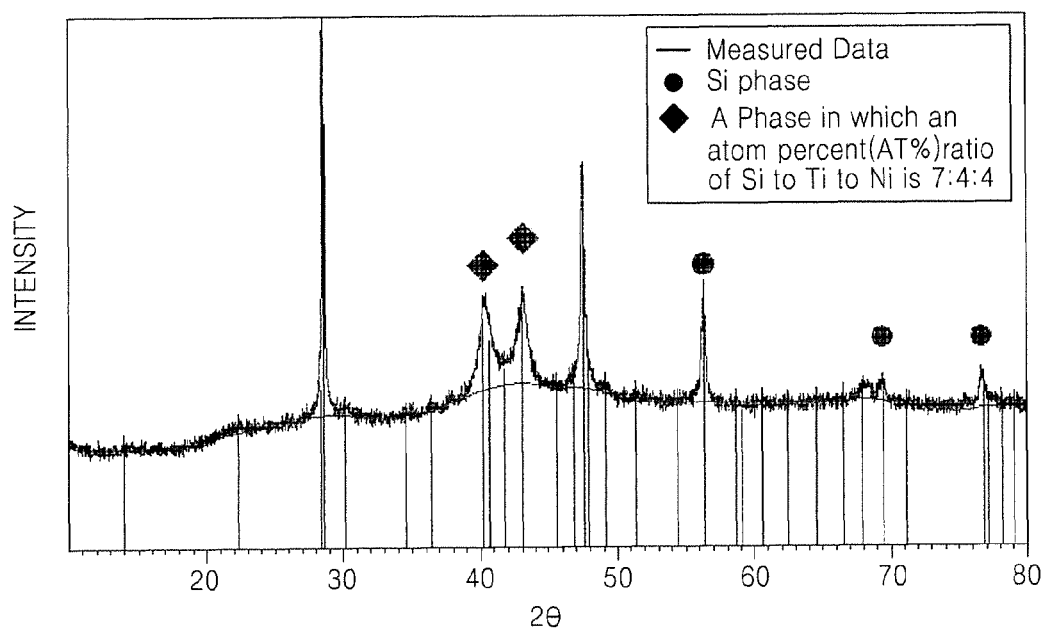
FIG. 3 is a graph of the XRD analysis results of a negative active material consisting of an alloy of Si, Ti, and Ni, prepared according to Comparative Example 1.
Figure 4:
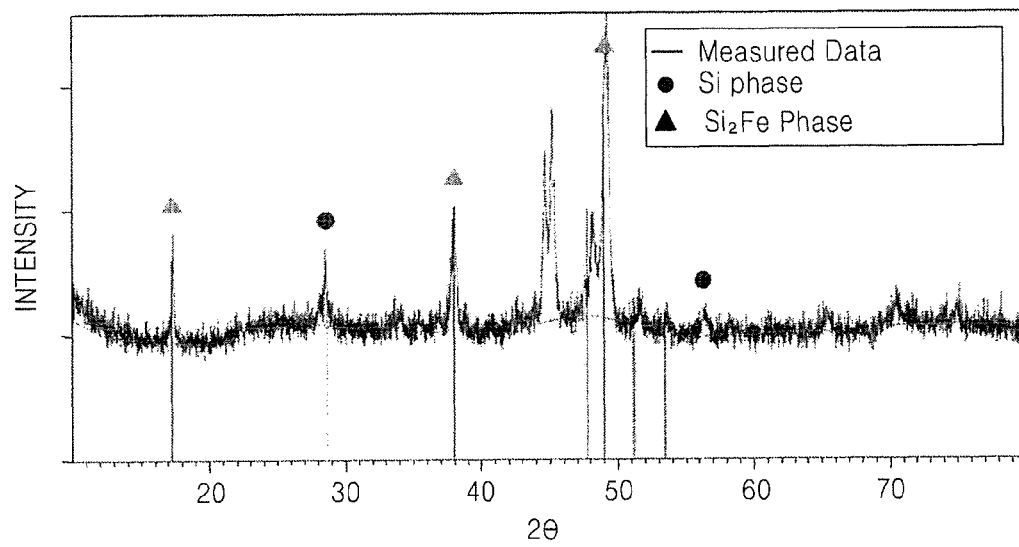
FIG. 4 is a graph of the XRD analysis results of a negative active material consisting of an alloy of Si, Al, and Fe, prepared according to Comparative Example 2.

The alloy phase may register at least one X-ray diffraction peak at a Bragg angle 2θ of about 20° to about 60° when measured using a CuK-α X-ray wavelength of 1.541 Å. In some embodiments, the alloy phase may register an X-ray diffraction peak at a Bragg angle 2θ of about 20° to about 55° when measured using a CuK-α X-ray wavelength of 1.541 Å, and in other embodiments, the alloy phase may register an X-ray diffraction peak at a Bragg angle 2θ of about 20° to about 53° when measured using a CuK-α X-ray wavelength of 1.541 Å. In some embodiments, the alloy phase may register a primary X-ray diffraction peak at a Bragg angle 2θ of about 44.754° (e.g., 44.7°±1.0°) when measured using a CuK-α X-ray wavelength of 1.541 Å, and secondary X-ray diffraction peaks at Bragg angles 2θ of 24.653° and 47.028° (e.g. 24.6°+1.0° and 47.0°+1.0°). The peaks may be confirmed via FIGS. 1 and 2, which will be described below.

The Si phase in the alloy may include Si active metal particles.

The Si active metal particles may have an average particle size of about 10 to about 200 nm. For example, the Si active metal particles may have an average particle size of about 10 to about 150 nm, and in some embodiments, the Si active metal particles may have an average particle size of about 10 to about 100 nm. The average particle size of the Si active metal particles may be obtained using Scherrer's equation by using the full width at half maximum (FWHM) of the X-ray diffraction peak corresponding to the Si (111) plane using a CuK-α wavelength of 1.541 Å. The peak of the Si (111) plane and the full width at half maximum may be confirmed via FIGS. 1 and 2 which will be described below.

When the average particle size of the Si active metal particles in the Si—Al—Fe alloy is within the ranges described above, a negative active material including the Si—Al—Fe alloy with a constant thickness is formed. Accordingly, the negative active material may more easily respond to volumetric changes during charging and discharging.

The Si—Al—Fe alloy may be prepared by preparing the parent alloy and quenching at a rate of about $10^3$ K/sec to about $10^7$ K/sec. For example, in some embodiments, the Si—Al—Fe alloy is prepared by quenching the parent alloy at a rate of about $10^5$ K/sec to about $10^7$ K/sec. The quenching may be performed using a melt spinner or by gas atomization, which is a process whereby rapid quenching is performed using a gas jet when a melted alloy is erupted.

The Si—Al—Fe alloy may further include a phase in which a ratio of atomic percentages of Al to Fe is 1 or more. For example, the ratio of atomic percentages of Al to Fe in the alloy may be about 1 to about 9, and in some embodiments may be about 1 1 to about 5. The phase in which the ratio of atomic percentages of Al to Fe is 1 or more may be, for example, at least one of $Al_8Fe_2Si$, $Al_{167.8}Fe_{44.9}S_{23.9}$, or $Al_{4.5}FeSi$.

When the negative active material further includes the phase in which a ratio of atomic percentages of Al to Fe is 1 or more, the atomic percentage of the remaining Fe is decreased, so that a phase that does not react with lithium ions, such as a $FeSi_2$ phase, is not formed. Therefore, a negative active material with higher capacity may be obtained.

In the negative active material, the elements Si, Al, and Fe may be doped with at least one transition metal selected from Ni, Co, Cu, Cr, Zr, Ti, Mn, V, and Zn. For example, the Si, Al, and Fe may be doped with at least one transition metal selected from Ni, Co, Zr, and Mn.

A ratio of atomic percentages of the transition metal to each of Si, Al, and Fe in the negative active material may be about 0.1 to about 5. In some embodiments, the ratio of atomic percentages of the transition metal to each of Si, Al, and Fe may be about 0.5 to about 2.

The negative active material doped with the transition metal(s) and/or the negative active material having a ratio of atomic percentages within the ranges described above may exhibit high capacity and have an improved cycle and lifetime characteristic.

According to another embodiment of the present invention, a method of preparing a negative active material includes preparing a parent alloy including a Si—Al—Fe alloy represented by Formula 1 below; preparing an alloy ribbon by quenching the parent alloy; and pulverizing the alloy ribbon to prepare an alloy powder.

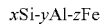  Formula 1 where 50 at %≤x≤90 at %, 5 at %≤y≤30 at %, 5 at %≤z≤30 at %, and x+y+z=100 at %.

In the Si—Al—Fe alloy, 50 at %≤x≤90 at %, 5 at %≤y≤30 at %, and 5 at %≤z≤30 at %. In some embodiments, 60 at %≤x≤90 at %, and in other embodiments 65 at %≤x≤90 at %. In some embodiments, 5 at %≤y≤25 at %, and in other embodiments, 5 at %≤y≤20 at %. In some embodiments, 5 at %≤z≤25 at %, and in other embodiments, 5 at %≤z≤20 at %. In some embodiments, y>z.

In the method of preparing a negative active material, first, a parent alloy including the Si—Al—Fe alloy represented by Formula 1 above is prepared. The preparing of the parent alloy may be performed by vacuum induction melting (VIM), arc melting, or mechanical alloying. In particular, to prevent oxidation by air, the preparing of the parent alloy may be performed by VIM in which the parent alloy is melted in a vacuum.

Next, an alloy ribbon is prepared by quenching the parent alloy. The preparing of the alloy ribbon may include quenching the parent alloy at a rate of about $10^3$ K/sec to about $10^7$ K/sec. For example, in some embodiments, the parent alloy is quenched at about $10^5$ K/sec to about $10^7$ K/sec. When the rate of the quenching is within the above described ranges, phases included in the alloy ribbon or the alloy powder may be appropriately and uniformly dispersed.

The quenching process may be performed using a melt spinner or by gas atomization. For example, in some embodiments, the quenching process may be performed using a melt spinner. However, the quenching method is not limited to the above examples. For example, the quenching method may be any suitable quenching process for preparing an alloy ribbon, such as single roll melt spinning in which a melt alloy is sprayed to a single roll, twin roll melt spinning in which a melt alloy is sprayed to twin rolls, gas-water atomization in which a melt alloy is sprayed on water, or centrifugal atomization using centrifugal force in which a revolving alloy electrode material is melted and evaporated by spark discharge and then quenched and solidified.

The alloy ribbon or the alloy powder may include a portion including a Si phase and a portion including an alloy phase (in which a ratio of atomic percentages of Si to Al to Fe is 3:3:2).

The alloy ribbon or the alloy powder may include a portion including a Si phase and a portion including an alloy phase (in which a ratio of atomic percentages of Si to Al to Fe is 3:3:2), wherein the two portions are uniformly dispersed. When the Si phase and the alloy phase are uniformly dispersed, the amount of a silicide phase, such as $FeSi_2$, is reduced, and thus, the amount of the active Si phase, capable of reversibly reacting with lithium ions, may be maintained.

The ratio of Si at % of the Si phase to Si at % of the alloy phase (in which the ratio of atomic percentage of Si to Al to Fe is 3:3:2) in the Si—Al—Fe alloy may be about 1:0.5 to about 1:12. In some embodiments, the ratio of Si at % of the Si phase to Si at % of the alloy phase in the Si—Al—Fe alloy may be about 1:0.5 to about 1:10. When the ratio of Si at % of the Si phase to Si at % of the alloy phase in the Si—Al—Fe alloy is within the above described ranges, an active Si phase capable of reversibly reacting with lithium ions, and an inactive alloy phase that does not react with lithium ions are appropriately mixed, and thus, a lithium secondary battery including the negative active material may have improved capacity and cycle-life characteristics.

In the alloy ribbon or the alloy powder, the alloy phase (in which the ratio of atomic percentages of Si to Al to Fe is 3:3:2) may be formed as a matrix phase. The matrix phase does not react with lithium ions and thus acts as a buffer to the volumetric change of Si during charging and discharging cycles. This thereby improves electron conductivity between the Si phases and improves the cycle-life characteristics of the battery.

The alloy phase may register at least one X-ray diffraction peak at a Bragg angle 2θ of about 20° to about 60° when measured using a CuK-α X-ray wavelength of 1.541 Å. In some embodiments, the alloy phase may register an X-ray diffraction peak at a Bragg angle 2θ of about 20° to about 55° when measured using a CuK-α X-ray wavelength of 1.541 Å, and in other embodiments, the alloy phase may register an X-ray diffraction peak at a Bragg angle 2θ of about 20° to about 53° when measured using a CuK-α X-ray wavelength of 1.541 Å. In some embodiments, the alloy phase may register a primary X-ray diffraction peak at a Bragg angle 2θ of about 44.754° (e.g., 44.7°±1.0°) when measured using a CuK-α X-ray wavelength of 1.541 Å and secondary X-ray diffraction peaks at Bragg angles 2θ of 24.653° and 47.028° (e.g. 24.6°+1.0° and 47.0°+1.0°) when measured using a CuK-α X-ray wavelength of 1.541 Å. The peaks may be confirmed via FIGS. 1 and 2, which will be described below.

The Si phase in the alloy may include Si active metal particles.

The Si active metal particles may have an average particle size of about 10 to about 200 nm. For example, the Si active metal particles may have an average particle size of about 10 to about 150 nm, and in some embodiments, the Si active metal particles may have an average particle size of about 10 to about 100 nm. The average particle size of the Si active metal particles may be obtained using Scherrer's equation by using the full width at half maximum (FWHM) of the X-ray diffraction peak corresponding to the Si (111) plane using a CuK-α wavelength of 1.541 Å. The peak of the Si (111) plane and the full width at half maximum may be confirmed via FIGS. 1 and 2 which will be described below.

When the average particle size of the Si active metal particles in the Si—Al—Fe alloy is within the ranges described above, a negative active material including the Si—Al—Fe alloy with a constant thickness is formed. Accordingly, the negative active material may more easily respond to volumetric changes during charging and discharging.

Then, the alloy ribbon is pulverized to prepare an alloy powder. The alloy ribbon is pulverized by mechanical milling, for example, ball-milling.

The alloy powder may have a median particle size distribution (D50) about 0.1 to about 10 μm. For example, in some embodiments, the alloy powder may have a D50 of about 0.2 to about 10 μm, and in other embodiments, the alloy powder may have a D50 of about 0.3 to about 10 μm. D50 indicates the median particle size distribution. This may be confirmed by FIG. 5 which will be described below.

When the D50 of the alloy powder is within the ranges described above, the alloy powder may be used to prepare a polar plate, and the alloy powder particles do not undesirably agglomerate. Accordingly, a lithium secondary battery including the negative active material may have improved cycle-life characteristics.

According to another embodiment of the present invention, a negative electrode for a lithium secondary battery includes the negative active material described above.

According to another embodiment of the present invention, a lithium secondary battery includes the negative electrode. The lithium secondary battery including the negative electrode may have improved initial discharge capacity and cycle-life characteristics.

Figure 6:
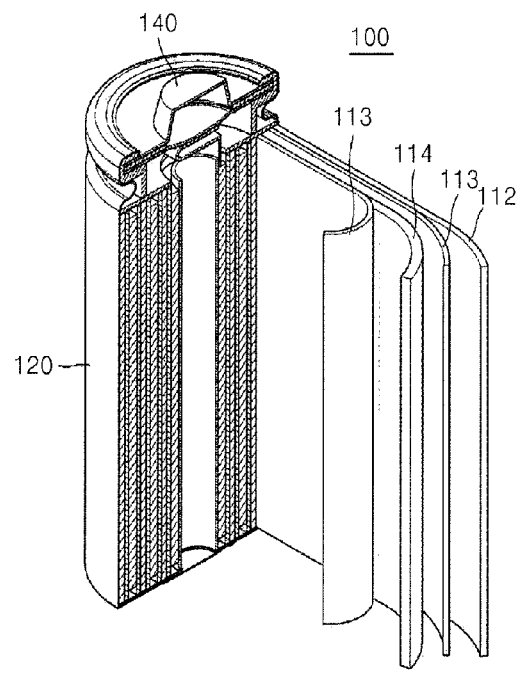
FIG. 6 is an exploded perspective view of a lithium secondary battery according to an embodiment of the present invention.

FIG. 6 is an exploded perspective view of a lithium secondary battery 100 according to an embodiment of the present invention. Referring to FIG. 6, the lithium secondary battery 100 includes a positive electrode 114, a negative electrode 112, a separator 113 between the positive electrode 114 and the negative electrode 112, and an electrolyte (not shown) which impregnates the negative electrode 112, the positive electrode 114, and the separator 113. The lithium secondary battery 100 also includes a battery container 120 and a sealing member 140 for sealing the battery container 120. The negative electrode 112, the positive electrode 114, and the separator 113 are sequentially deposited and then wound in a spiral form and then, the wound structure is placed in the battery container 120 and sealed with the sealing member 140, thereby manufacturing the lithium secondary battery 100.

The positive electrode 114 includes a current collector and a positive active material layer disposed on the current collector. Examples of positive active materials that may be used to form the positive active material layer include compounds that allow lithium to be reversibly intercalated and deintercalated, for example, lithiated intercalation compounds. The positive active material may be a compound represented by any of the following formulae: $Li_aA_{1-b}X_bD_2$ where $0.95 \leq a \leq 1.1$ and $0 \leq b \leq 0.5$; $Li_aE_{1-b}X_bO_{2-c}D_c$ where $0.95 \leq a \leq 1.1$, $0 \leq b \leq 0.5$, and $0 \leq c \leq 0.05$; $LiE_{2-b}X_bO_{4-c}D_c$ where $0 \leq b \leq 0.5$ and $0 \leq c \leq 0.05$; $Li_aNi_{1-b-c}Co_bBcD_\alpha$ where $0.955 \leq a \leq 1.1$, $0 \leq b \leq 0.5$, $0 \leq c \leq 0.05$, and $0 < \alpha < 2$; $Li_aNi_{1-b-c}Co_bX_cO_{2-\alpha}M_\alpha$ where $0.95 \leq a \leq 1.1$, $0 \leq b \leq 0.5$, $0 \leq c \leq 0.05$, and $0 < \alpha < 2$; $Li_aNi_{1-b-c}Co_bX_cO_{2-\alpha}M_2$ where $0.95 \leq a \leq 1.1$, $0 \leq b \leq 0.5$, $0 \leq c \leq 0.05$, and $0 < \alpha < 2$; $Li_aNi_{1-b-c}Mn_bX_cD_\alpha$ where $0.95 \leq a \leq 1.1$, $0 \leq b \leq 0.5$, $0c \leq 0.05$, and $0 < \alpha \leq 2$; $Li_aNi_{1-b-c}Mn_bX_cO_{2-\alpha}M_\alpha$ where $0.95 \leq a \leq 1.1$, $0b \leq 0.5$, $0 \leq c \leq 0.05$, and $0 < \alpha < 2$; $Li_aNi_{1-b-c}Mn_bX_cO_{2-\alpha}M_2$ where $0.95 \leq a \leq 1.1$, $0 \leq b \leq 0.5$, $0 \leq c \leq 0.05$, and $0 < \alpha < 2$; $Li_aNi_bE_cG_dO_2$ where $0.90 \leq a \leq 1.1$, $0 \leq b \leq 0.9$, $0 \leq c \leq 0.5$, and $0.001 \leq d \leq 0.1$; $Li_aNi_bCo_cMn_dG_eO_2$ where $0.90 \leq a \leq 1.1$, $0 \leq b \leq 0.9$, $0 \leq c \leq 0.5$, $0 \leq d \leq 0.5$, and $0 \leq e \leq 0.1$; $Li_aNiG_bO_2$ where $0.90 \leq a \leq 1.1$ and $0.001 \leq b \leq 0.1$; $Li_aCoG_bO_2$ where $0.90 \leq a \leq 1.1$ and $0.001 \leq b \leq 0.1$; $Li_aMnG_bO_2$ where $0.90 \leq a \leq 1.1$ and $0.001 \leq b \leq 0.1$; $Li_aMn_2G_bO_4$ where $0.90 \leq a \leq 1.1$ and $0 \leq b \leq 0.1$; $LiQO_2$; $LiQS_2$; $LiV_2O_5$; $LiZO_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; $LiFePO_4$; and lithium titanate.

In these chemical formulae, A is selected from Ni, Co, Mn, or a combination thereof, but is not limited thereto; X is selected from Al, Ni, Co, Mn, Cr, Fe, Mg, Sr, V, rare earth elements, or a combination thereof, but is not limited thereto; D is selected from O, F, S, P, or a combination thereof, but is not limited thereto; E is selected from Co, Mn, or a combination thereof, but is not limited thereto; M is selected from F, S, P, or a combination thereof, but is not limited thereto; G is selected from Al, Cr, Mn, Fe, Mg, La, Ce, Sr, V, or a combination thereof, but is not limited thereto; Q is selected from Ti, Mo, Mn, or a combination thereof, but is not limited thereto; Z is selected from Cr, V, Fe, Sc, Y, or a combination thereof, but is not limited thereto; and J is selected from V, Cr, Mn, Co, Ni, Cu, or a combination thereof, but is not limited thereto. For example, the positive active material may be lithium titanate.

The lithium titanate may have any crystal structure. For example, the lithium titanate may be a spinel type lithium titanate, an anatase type lithium titanate, or a ramsdellite type lithium titanate.

In particular, the positive active material may be represented by $Li_{4-x}Ti_5O_{12}$ where $0 \leq x \leq 3$. For example, the positive active material may be $Li_4Ti_5O_{12}$, however, any suitable positive active material may be used.

Alternatively, the positive active material may be $Li_aNi_b$-$Co_cMn_dG_eO_2$ where $0.90 \leq a \leq 1.1$, $0 \leq b \leq 0.9$, $0 \leq c \leq 0.5$, $0 \leq d \leq 0.5$, and $e=0$. For example, the positive active material may be $Li_aNi_bCo_cMn_dG_eO_2$ where a=1, b=0.5, c=0.2, d=0.3, and e=0, or $LiMn_2O_4$, however, any suitable positive active material may be used.

A lithium electrode may be used as the positive electrode 114.

The compounds used as the positive active material may further include a coating layer on their surfaces. Alternatively, the compounds may be used in combination with a compound including a coating layer. The coating layer may include at least one coating element compound selected from an oxide of a coating element, a hydroxide of a coating element, an oxyhydroxide of a coating element, an oxycarbonate of a coating element, or a hydroxy carbonate of a coating element. The coating element compounds may be amorphous or crystalline. The coating element included in the coating layer may be Mg, Al, Co, K, Na, Ca, Si, Ti, V, Sn, Ge, Ga, B, As, Zr, or a mixture thereof.

A coating layer may be formed by using the coating elements in the aforementioned compounds by using any method that does not adversely affect the physical properties of the positive active material (e.g., spray coating or immersion may be used). The coating layer formation methods are known to those of ordinary skill in the art.

The positive active material layer may further include a binder.

The binder may allow positive active material particles to adhere to each other and to the current collector. Examples of the binder include, but are not limited to, polyamide imide, polyvinylalcohol, carboxymethylcellulose, hydroxypropylcellulose, diacetylcellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubber, acrylated styrene-butadiene rubber, epoxy resins, and nylon.

The current collector may be an Al current collector, however, any suitable current collector may be used. The current collector may have fine unevenness on its surface so as to increase the adhesive strength of the current collector to the positive active material.

To prepare the positive electrode, a positive active material and a binder (and optionally a conductive material) are mixed in a solvent to prepare a composition for forming a positive active material layer. The composition is applied to a current collector and dried to form the positive electrode. Methods of manufacturing positive electrodes are known in the art. The solvent may be N-methylpyrrolidone, but the solvent is not limited thereto.

The positive active material layer may further include a conductive material (e.g., conductive agent). The conductive material may be at least one of carbon black, Ketjen black, acetylene black, artificial graphite, natural graphite, copper powder, nickel powder, aluminum powder, silver powder, or polyphenylene. However, the conductive material is not limited thereto.

The amount of each of the binder and the conductive agent may be about 2 to about 5 parts by weight based on 100 parts by weight of the positive active material. The amount of the solvent may be about 1 to about 10 parts by weight based on 100 parts by weight of the positive active material. When the amounts of the binder, the conductive agent, and the solvent are within the ranges described above, the positive active material layer may be relatively easily formed.

The negative electrode 112 may include a current collector and a negative active material layer disposed on the current collector. A negative active material for forming the negative active material layer may include a Si—Al—Fe alloy represented by Formula 1 below, wherein the Si—Al—Fe alloy includes a portion in which a Si phase and an alloy phase (in which a ratio of atomic percentages of Si to Al to Fe in the alloy is 3:3:2) are dispersed.

$$x\text{Si-}y\text{Al-}z\text{Fe} \qquad \text{Formula 1}$$

wherein 50 at %≤x≤90 at %, 5 at %≤y≤30 at %, 5 at %≤z≤30 at %, and x+y+z=100 at %.

In the Si—Al—Fe alloy, 50 at %≤x≤90 at %, 5 at %≤y≤30 at %, and 5 at %≤z≤30 at %. In some embodiments, 60 at %≤x≤90 at %, and in other embodiments 65 at %≤x≤90 at %. In some embodiments, 5 at %≤y≤25 at %, and in other embodiments, 5 at %≤y≤20 at %. In some embodiments, 5 at %≤z≤25 at %, and in other embodiments, 5 at %≤z≤20 at %.

In the negative active material, the Si—Al—Fe alloy may include a portion including an active Si phase capable of reversibly reacting with lithium ions, and an inactive alloy phase that does not react with lithium ions, i.e., an alloy phase in which a ratio of atomic percentages of Si to Al to Fe is 3:3:2.

The negative active material contains 50 to 90 at % of Si, and thus a lithium secondary battery with high capacity may be obtained. In addition, the negative active material includes an inactive alloy phase that does not react with lithium ions, i.e., a phase in which a ratio of atomic percentages of Si to Al to Fe is 3:3:2, and thus destruction of a lithium secondary battery as a result of stress resulting from a volumetric change of Si during charging and discharging cycles may be prevented or reduced. Accordingly, a lithium secondary battery including the negative active material has improved cycle-life characteristics.

The negative active material layer may further include a binder. The binder may be one or more of the binders described for use in the positive electrode.

The current collector of the negative electrode 112 may be a Cu current collector, but it is not limited thereto. For example, the current collector may be formed of stainless steel, aluminum, nickel, titanium, heat-treated carbon, copper, stainless steel that is surface-treated with carbon, nickel, titanium, or silver, or an Al—Cd alloy. In addition, as in the current collector of the positive electrode 114, the current collector of the negative electrode 112 may have fine unevenness on its surface so as to increase the adhesive strength of the current collector to the negative active material. The current collector of the negative electrode may be used in any suitable form including films, sheets, foils, nets, porous structures, foams, or non-woven fabrics.

The negative active material layer may selectively include a conductive agent (e.g., conductive material). The conductive agent may be one or more of the same conductive materials as those described for use in the positive electrode.

To prepare the negative electrode 112, a negative active material and a binder (and optionally a conductive material) are mixed in a solvent to prepare a composition for forming a negative active material layer. The composition is applied to a current collector and dried to form the negative electrode 112. Methods of manufacturing negative electrodes are known in the art. The solvent may be N-methylpyrrolidone, but it is not limited thereto.

The amount of each of the binder and the conductive agent may be about 2 to about 5 parts by weight based on 100 parts by weight of the negative active material. The amount of the solvent may be about 1 to about 10 parts by weight based on 100 parts by weight of the negative active material. When the amounts of the binder, the conductive agent, and the solvent are within the ranges described above, the negative active material layer may be relatively easily formed.

If desired, the composition for forming the positive active material layer and the composition for forming the negative active material layer may further include a plasticizer to form pores in the electrode.

The electrolytic solution includes a non-aqueous organic solvent and a lithium salt.

The non-aqueous organic solvent may act as a medium through which ions involved in the electrochemical reaction of the lithium battery may be transported.

The non-aqueous organic solvent may be a carbonate-based solvent, an ester-based solvent, an ether-based solvent, a ketone-based solvent, an alcohol-based solvent, or an aprotic solvent. Examples of the carbonate-based solvent include dimethyl carbonate (DMC), diethyl carbonate (DEC), dipropyl carbonate (DPC), methylpropyl carbonate (MPC), ethyl propyl carbonate (EPC), ethyl methyl carbonate (EMC), ethylene carbonate (EC), propylene carbonate (PC), and butylene carbonate (BC). Examples of the ester-based solvent include methyl acetate, ethyl acetate, n-propyl acetate, dimethylacetate, methyl propionate, ethyl propionate, γ-butyrolactone, decanolide, valerolactone, mevalonolactone, and caprolactone. Examples of the ether-based solvent include dibutyl ether, tetraglyme, diglyme, dimethoxyethane, 2-methyltetrahydrofuran, and tetrahydrofuran. An example of the ketone-based solvent may be cyclohexanone. Examples of the alcohol-based solvent include ethyl alcohol and isopropyl alcohol. Examples of the aprotic solvent include: nitriles such as R—CN, where R is a linear, branched, or cyclic C2 to C20 hydrocarbon group and has a double-bond, aromatic ring or ether bond; amides such as dimethylformamide; dioxolanes such as 1,3-dioxolane; and sulfolanes.

A single non-aqueous organic solvent may be used alone or two or more solvents may be used in combination. If two or more non-aqueous organic solvents are used in combination, a volume ratio of the solvents may be appropriately adjusted according to the desired performance of the battery. Such adjustments would be known to those of ordinary skill in the art.

The lithium salt used in the electrolyte for a lithium secondary battery is dissolved in the organic solvent and acts as a lithium-ion source, thereby enabling the basic operation of the lithium secondary battery by promoting transfer of lithium ions between the positive electrode and the negative electrode. For example, the lithium salt may be at least one supporting electrolytic salt selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiCl, LiI, and $LiB(C_2O_4)_2$ [lithium bis(oxalato) borate; LiBOB]. The concentration of the lithium salt may be about 0.1 to about 2.0 M. If the concentration of the lithium salt is within this range, the electrolyte has appropriate conductivity and viscosity and thus exhibits good electrolytic performance, and lithium ions may effectively migrate.

According to the type of lithium secondary battery, a separator 113 may be disposed between the positive electrode 114 and the negative electrode 112. The separator may be a single layer of polyethylene, polypropylene, or polyvinylidene fluoride, or multiple layers of at least two of these materials. Also, the separator may be a mixed multi-layer, such as a polyethylene/polypropylene layer, a polyethylene/polypropylene/polyethylene layer, or a polypropylene/polyethylene/polypropylene layer.

Lithium secondary batteries can be classified as lithium ion batteries, lithium ion polymer batteries, or lithium polymer batteries, according to the separator and the electrolyte. Lithium secondary batteries can be classified as cylindrical, rectangular, coin-type, or pouch-type, according to the shape of the battery. Lithium secondary batteries can also be classified as bulk-type or film-type, according to the size of the battery. The manufacturing methods of the batteries described above are known in the art.

One or more embodiments will now be described in further detail with reference to the following examples. These examples are for illustrative purposes only and are not intended to limit the scope of the one or more embodiments.

EXAMPLES

Preparation of Negative Active Material

Example 1

Negative active Material with a Composition of 68 at % Si-16 at % Al-16 at % Fe Alloy Si, Al, and Fe were mixed at a ratio of atomic percentages of 68:16:16. The mixture was melted in vacuum by using an induction melting furnace to prepare a parent alloy of Si, Al, and Fe. The prepared parent alloy was pulverized into an appropriate size, and the pulverized parent alloy was put in a graphite crucible, installed in a melt spinner, and then mixed at a temperature of 1400 to 1500° C. for 5 minutes while being melted. The melt-mixed parent alloy was quenched to room temperature at a quenching rate of $10^7$ K/sec to prepare an alloy ribbon. The alloy ribbon was pulverized to prepare a negative active material formed of alloy powder having a median particle size distribution (D50) of 3.2 μm.

In the negative active material, a matrix phase alloy having 16 at % Si-16 at % Al-10.67 at % Fe was formed, thereby having a ratio of atomic percentages of Si to Al to Fe of 3:3:2. The remaining atomic percentage of Fe in the negative active material was 5.33 at % (obtained by subtracting the 10.67 at % of Fe in the matrix from the 16 at % Fe in the negative active material). The 5.33 at % Fe reacted with Si to form a $FeSi_2$ phase with a composition of 5.33 at % Fe-10.66 at % Si.

The remaining atomic percentage of Si (obtained by subtracting the 16 at % Si present in the matrix phase and the 10.66 at % Si present in the $FeSi_2$ phase from the 68 at % Si in the negative active material) was 41.34 at %. Si at % of matrix phase alloy having a ratio of atomic percentages of Si to Al to Fe of 3:3:2 was 16 at % from the composition 16 at % Si-16 at % Al-10.67 at % Fe. Therefore, in the negative active material, the ratio of Si at % of the Si phase to Si at % of the alloy matrix phase was 41.34:16. The ratio of Si at % of the Si phase to Si at % of the alloy matrix phase can be confirmed by comparing the capacity results shown in FIG. 8, which is a graph of the cycle characteristics of the lithium secondary battery, with the at % of the active Si phase included in the negative active material.

Example 2

Negative Active Material with a Composition of 65 at % Si-21 at % Al-14 at % Fe alloy A negative active material was prepared in the same manner as in Example 1, except that Si, Al, and Fe were mixed at a ratio of atomic percentages of 65:21:14 instead of a ratio of atomic percentages of 68:16:16.

In the negative active material, a matrix phase alloy was formed to have a composition 21 at % Si-21 at % Al-14 at % Fe, thereby having a ratio of atomic percentages of Si to Al to Fe of 3:3:2. Substantially no $FeSi_2$ phase was formed.

The remaining atomic percentage of Si (obtained by subtracting the 21 at % Si present in the matrix phase from the 65 at % of Si in the negative active material) was 44 at %. Thus, an active 44 at % Si phase was formed. Si at % of matrix phase alloy having a ratio of atomic percentages of Si to Al to Fe of 3:3:2 was 21 at % from the composition 21 at % Si-21 at % Al-14 at % Fe.

Therefore, in the negative active material, the ratio of Si at % of the Si phase to Si at % of the alloy matrix phase was 44:21. The ratio of Si at % of the Si phase to Si at % of the alloy matrix phase can be confirmed by comparing capacity results shown in FIG. 8, which is a graph of the cycle characteristics of the lithium secondary battery, with the at % of the active Si phase included in the negative active material.

Comparative Example 1

Negative Active Material with a Composition of 68 at % Si-16 at % Ti-16 at % Ni Alloy A negative active material was prepared in the same manner as in Example 1, except that Si, Ti, and Ni were mixed at a ratio of atomic percentages of 68:16:16 instead of 68:16:16.

Comparative Example 2

Negative Active Material with a Composition of 60 at % Si-12 at % Al-2θ at % Fe Alloy A negative active material was prepared in the same manner as in Example 1, except that Si, Al, and Fe were mixed at a ratio of atomic percentages of 60:12:28 instead of 68:16:16.

In the negative active material, the at % of Fe was larger than the at % of Al, and an inactive alloy matrix phase was not formed. However, 2θ at % Fe reacted with Si so as to form a $FeSi_2$ phase with a composition of 2θ at % Fe-56 at % Si.

(Manufacturing of lithium Secondary Battery)

Example 3

The negative active material prepared according to Example 1, polyamide imide, and Ketjen black were mixed at a weight ratio of 90:8:2 in N-methylpyrrolidone to prepare a negative active material slurry. The negative active material slurry was coated on a Cu current collector having a thickness of 10 μm using a doctor blade. The coated Cu current collector was dried in vacuum at 350° C. for 1 hour, thereby forming a negative active material layer having a thickness of 42 μm stacked on the Cu current collector. A hole having a diameter of 16 mm was made therethrough, thereby completing the manufacture of a negative electrode.

The negative electrode, a lithium electrode as a counter electrode, a microporous polypropylene separator (Celgard 3501), and an electrolytic solution including ethylene carbonate (EC), diethyl carbonate (DEC), and fluoroethylene carbonate (FEC) (the volume ratio of EC:DEC:FEC was 5:75: 25) were assembled in a helium-filled glove box to manufacture a coin-type half cell.

Example 4

A coin-type half cell was manufactured in the same manner as in Example 3, except that the negative active material prepared according to Example 2 was used instead of the negative active material of Example 1.

Comparative Example 3

A coin-type half cell was manufactured in the same manner as in Example 3, except that the negative active material prepared according to Comparative Example 1 was used instead of the negative active material of Example 1.

Comparative Example 4

A coin-type half cell was manufactured in the same manner as in Example 3, except that the negative active material prepared according to Comparative Example 2 was used instead of the negative active material of Example 1.

(Evaluation of Negative Active Material and Performance Evaluation of lithium Secondary Battery)

Evaluation Example 1

X-Ray Diffraction (XRD) Measurement

XRD analysis (X'pert PRO MPD, available from PANalytical) was performed on the negative active materials of Examples 1 and 2 and Comparative Examples 1 and 2. The results are shown in FIGS. 1 through 4. The test conditions were as follows: CuK-α X-ray wavelength of 1.541 Å.

Referring to FIGS. 1 through 4, in the XRD analysis of the negative active materials of Examples 1 and 2, a Si phase and an alloy phase (in which the ratio of atomic percentages of Si to Al to Fe is 3:3:2) were observed. In contrast, in the XRD analysis of the negative active material of Comparative Example 1, a Si phase and an alloy phase (in which the ratio of atomic percentages of Si to Ti to Ni is 7:4:4 were observed). In addition, in the XRD analysis of the negative active material of Comparative Example 2, a Si phase and a $Si_2Fe$ phase were observed, while the alloy phase (in which the ratio of atomic percentages of Si to Al to Fe was 3:3:2) was not observed.

In more detail, in the XRD analysis of the negative active materials of Examples 1 and 2 and Comparative Examples 1 and 2, a peak for the Si phase was observed at Bragg (2θ) angles of 28.5° and 47.5°. In contrast, a peak for the alloy phase (in which a ratio of atomic percentages of Si to Al to Fe was 3:3:2) was observed at a Bragg (2θ) angle ranging from 21.5° to 51.78° in the XRD of the negative active materials of Examples 1 and 2. Specifically, each of Examples 1 and 2 exhibited a primary peak at 44.754° and secondary peaks at 24.653° and 47.028°.

In Comparative Example 1, the alloy phase in which a ratio of atomic percentages of Si to Ti to Ni was 7:4:4 exhibited a peak at a Bragg (2θ) angle ranging from 14° to 79°. The alloy phase in which the ratio of atomic percentages of Si to Al to Fe was 3:3:2 was not observed in the XRD analysis of the negative active material of Comparative Example 2.

Also, in the XRD analysis of the negative active materials of Examples 1 and 2, a peak corresponding to the Si (111) plane was observed at a Bragg (2θ) angle of 28.5°. The full width at half maximum (FWHM) was obtained from that peak, and average particle sizes of the negative active materials of Examples 1 and 2 were obtained using Scherrer's equation of Equation 1 below. The results are shown in Table 1 below.

$$t = K\lambda/\beta\cos\theta \text{ (here, } K\text{(shape factor) is 0.9, } \lambda\text{(X-ray wavelength) is 1.5406 Å, } \beta \text{ is FWHM, and a Bragg (}\theta\text{) angle is 14.25°)} \quad \text{Equation 1}$$

TABLE 1

|  | full width at half maximum (FWHM) | Average particle size (nm) |
| --- | --- | --- |
| Example 1 | 0.2128 | 38.5 |
| Example 2 | 0.2204 | 37.2 |

Referring to Table 1, average particle sizes of the Si active metal particles of the negative active materials of Examples 1 and 2 are about 38.5 nm and about 37.2 nm, respectively.

In the XRD analysis of the negative active material of Example 1, the $FeSi_2$ phase was observed at Bragg ($2\theta$) angles of 17.5°, 37.8°, and 49.2°.

Evaluation Example 2

Measurement of the Particle Size Distribution of Negative Active Materials

Figure 5:
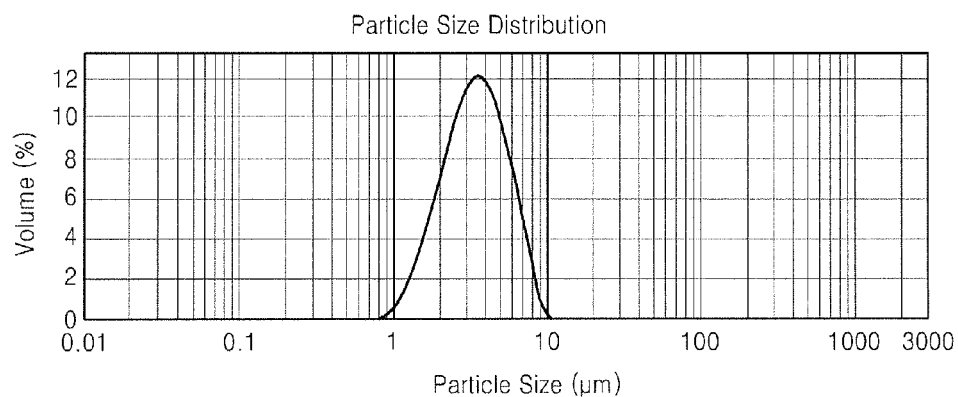
FIG. 5 is a graph of the particle size distribution of a negative active material according to Example 1.

About 0.1 g of the negative active material powders of Example 1 and the remaining of an appropriate amount of distilled water were added to 20 mL of vial bottle. The negative active material powders of Example 1 and distilled water in the vial bottle were dispersed using ultrasonic disperser for about 1 minute. A graph of the particle size distribution of the negative active material powders of Example 1 was drawn using LS 13 320 model available from Hitachi. The results are shown in FIG. 5 below. Referring to FIG. 5, the average particle size (D50) of the negative active material powders of Example 1 were about 4 µm to about 6 µm.

Evaluation Example 3

Measurement of Capacity and Cycle Characteristics

Figure 7:
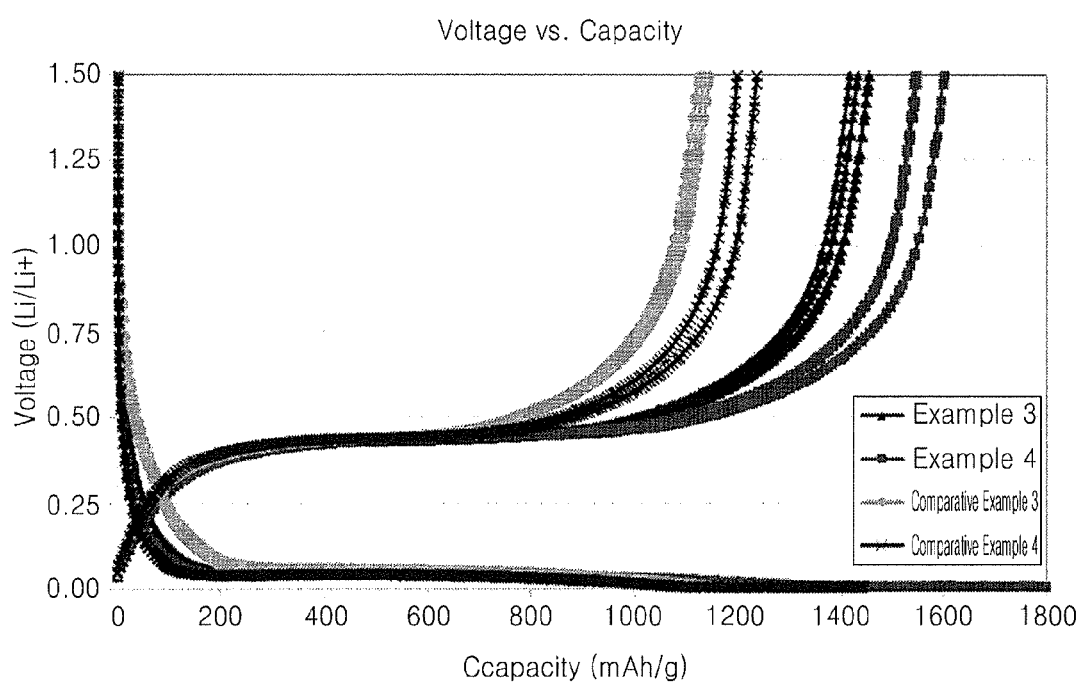
FIG. 7 is a graph comparing the initial charge/discharge efficiencies of the lithium secondary batteries manufactured according to Examples 3 and 4 and Comparative Examples 3 and 4.
Figure 8:
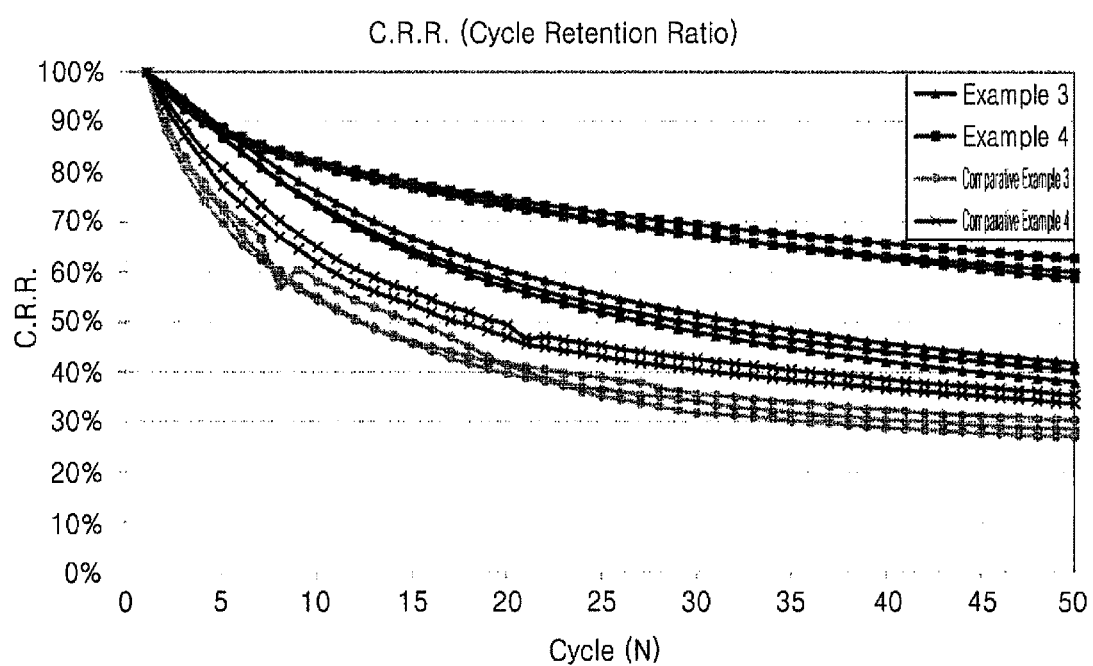
FIG. 8 is a graph comparing the cycle characteristics of the lithium secondary batteries of Examples 3 and 4 and Comparative Examples 3 and 4.

Cell characteristics of the coin-type half cells manufactured according to Examples 3 and 4 and Comparative Examples 3 and 4 were evaluated, and the results are shown in FIGS. 7 and 8 and Table 2 below.

FIG. 7 illustrates the results of the initial charge/discharge tests of the coin-type half cells of Examples 3 and 4 and Comparative Examples 3 and 4. The initial charge/discharge tests were performed at a charge/discharge current density of 0.1, a charge cut-off voltage of 10 mV ($Li/Li^+$), and a discharge cut-off voltage of 1.5 V ($Li/Li^+$).

FIG. 8 illustrates the cycle retention rate obtained by repeatedly charging and discharging the coin-type half cells of Examples 3 and 4 and Comparative Examples 3 and 4 as follows: once at 0.1 C, once at 0.2 C, and at 1 C up to 50 cycles. A change in capacity according to each cycle was measured, and the cycle retention rate was calculated therefrom. The cycle retention rate (%) is obtained using Equation 2 below.

Cycle retention rate (%)=discharge capacity at $50^{th}$ cycle/discharge capacity at $1^{st}$ cycle×100     Equation 2

TABLE 2

|  | Discharge capacity at $1^{st}$ cycle (mAh/g) | Discharge capacity at $50^{th}$ cycle (mAh/g) | Initial efficiency (%) | Cycle retention rate (%) |
| --- | --- | --- | --- | --- |
| Example 3 | 1027.03 | 416.97 | 86.5 | 40.6 |
| Example 4 | 1101.11 | 661.77 | 88.3 | 60.1 |
| Comparative Example 3 | 970.78 | 279.58 | 85.1 | 28.8 |
| Comparative Example 4 | 992.21 | 345.29 | 85.5 | 34.8 |

Referring to FIGS. 7 and 8 and Table 2, the lithium secondary batteries of Examples 3 and 4 have higher initial discharge capacities, higher initial efficiencies, and higher cycle retention rates than the lithium secondary batteries of Comparative Examples 3 and 4.

From the results, it is confirmed that the lithium secondary batteries of Examples 3 and 4 (each of which includes a negative electrode including the negative active material formed of a Si—Al—Fe alloy that includes a portion including a Si phase and a portion including an alloy phase in which a ratio of atomic percentages of Si to Al to Fe was 3:3:2) have higher initial discharge capacities, higher initial efficiencies, and higher cycle retention rates than the lithium secondary battery of Comparative Example 3 (including a negative electrode including a negative active material that is formed of a Si—Ti—Ni alloy that includes a portion including a Si phase and an alloy phase in which a ratio of atomic percentages of Si to Ti to Ni is 7:4:4) and the lithium secondary battery of Comparative Example 4 (including a negative electrode including a negative active material that does not include an alloy phase in which a ratio of atomic percentages of Si to Al to Fe was 3:3:2).

Meanwhile, as described in Evaluation Example 1 above, the negative active material of Example 1 included in the lithium secondary battery of Example 3 includes the $FeSi_2$ phase that does not react with lithium ions. Thus, the lithium secondary battery of Example 3 had a lower initial discharge capacity, lower initial efficiency, and lower cycle retention rate than the lithium secondary battery of Example 4, which included the negative active material not including the $FeSi_2$ phase.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A negative active material for a rechargeable lithium battery, comprising a Si—Al—Fe alloy represented by Formula 1, the Si—Al—Fe alloy comprising a Si phase and an alloy phase, the alloy phase comprising Si, Al, and Fe in a ratio of atomic percentages of about 3:3:2:

$x$Si-$y$Al-$z$Fe     Formula 1 wherein 65 at %≤$x$≤90 at %, 5 at %≤$y$≤30 at %, 5 at %≤$z$≤30 at %, y is equal to or greater than z, and x+y+z=100 at %.

2. The negative active material of claim 1, wherein the alloy phase registers an X-ray diffraction peak at a Bragg angle $2\theta$ of about 20° to about 60° when measured using a CuK-α X-ray wavelength of 1.541 Å.

3. The negative active material of claim 1, wherein the alloy phase registers a primary X-ray diffraction peak at a Bragg angle $2\theta$ of about 44.7±1.0° when measured using a CuK-α X-ray wavelength of 1.541 Å.

4. The negative active material of claim 3, wherein the alloy phase registers a first secondary X-ray diffraction peak at a Bragg angle 2θ of about 24.6±1.0° when measured using a CuK-α X-ray wavelength of 1.541 Å or a second secondary X-ray diffraction peak at a Bragg angle 2θ of about 47.0±1.0° when measured using a CuK-α X-ray wavelength of 1.541 Å.

5. The negative active material of claim 1, wherein y>z.

6. The negative active material of claim 1, wherein the Si—Al—Fe alloy further comprises a second alloy phase, the second alloy phase comprising Al and Fe in a ratio of atomic percentages of about 1 or greater.

7. The negative active material of claim 1, wherein at least a portion of the Si—Al—Fe alloy comprises a uniform dispersion of the Si phase and the alloy phase.

8. The negative active material of claim 1, wherein a ratio of Si at % of the Si phase to Si at % of the alloy phase in the Si—Al—Fe alloy is about 1:0.5 to about 1:12.

9. The negative active material of claim 1, wherein the alloy phase comprises a matrix phase.

10. The negative active material of claim 1, wherein the Si phase comprises Si active metal particles.

11. The negative active material of claim 10, wherein the Si active metal particles have an average particle size of about 10 nm to about 200 nm.

12. The negative active material of claim 1, wherein the Si—Al—Fe alloy comprises a quenched alloy quenched at a rate of about $10^3$ K/sec to about $10^7$ K/sec.

13. The negative active material of claim 1, wherein the Si—Al—Fe alloy comprises Si, Al, and Fe, and at least one of the Si, Al, or Fe is doped with a transition metal selected from the group consisting of Ni, Co, Cu, Cr, Zr, Ti, Mn, V, Zn and combinations thereof.

14. The negative active material of claim 13, wherein the Si, Al, or Fe is doped with an amount of the transition metal of about 0.1 at % to about 5 at %.

15. A method of manufacturing the negative active material for a rechargeable lithium battery of claim 1, the method comprising:
preparing a parent alloy comprising a Si—Al—Fe alloy represented by Formula 1:

$x$Si-$y$Al-$z$Fe        Formula 1 wherein 50 at %≤x≤90 at %, 5 at %≤y≤30 at %, 5 at %≤z≤30 at %, and x+y+z=100 at %;
cooling the parent alloy to prepare an alloy ribbon to form a Si phase and an alloy phase, the alloy phase comprising Si, Al, and Fe in a ratio of atomic percentages of about 3:3:2; and
pulverizing the alloy ribbon to prepare an alloy powder.

16. The method of claim 15, wherein the preparing the parent alloy comprises vacuum induction melting, arc melting or mechanical alloying.

17. The method of claim 15, wherein the cooling the parent alloy comprises quenching the parent alloy at a rate of about $10^3$ K/sec to about $10^7$ K/sec.

18. The method of claim 17, wherein the quenching comprises melt spinning or gas atomization.

19. The method of claim 15, wherein the alloy powder has a median particle diameter (D50) of about 0.1 μm to about 10 μm.

20. A rechargeable lithium battery, comprising:
a negative electrode comprising the negative active material of claim 1;
a positive electrode comprising a positive active material; and
an electrolyte.

* * * * *